Dec. 15, 1964 E. L. GLASER 3,161,763
ELECTRONIC DIGITAL COMPUTER WITH WORD FIELD SELECTION
Filed Jan. 26, 1959 3 Sheets-Sheet 1

INVENTOR.
EDWARD L. GLASER
BY
Christie, Parker & Hale
ATTORNEYS

INVENTOR.
EDWARD L. GLASER
BY Christie Parker & Hale
ATTORNEYS

INVENTOR.
EDWARD L. GLASER
BY
Christie, Parker & Hale
ATTORNEYS

United States Patent Office 3,161,763
Patented Dec. 15, 1964

3,161,763

ELECTRONIC DIGITAL COMPUTER WITH WORD FIELD SELECTION

Edward L. Glaser, Pasadena, Calif., assignor to Burroughs Corporation, Detroit, Mich., a corporation of Michigan
Filed Jan. 26, 1959, Ser. No. 788,822
7 Claims. (Cl. 235—157)

This invention relates to electronic digital computers, and more particularly, is concerned with an internally programmed computer which is capable of operating, according to certain commands, on specified portions only of the words normally manipulated by the computer.

Most electronic digital computers operate on groups of characters, called words, which are of fixed length. It is sometimes desirable to have a computer operate on fewer characters than would constitute a complete word. Computers using a variable word length have been proposed but the design of the computer is more complex and the job of the programmer becomes more difficult.

According to the present invention, a digital computer operating on words of fixed length can be made to operate on only a selected portion of the words, referred to as a field. The equivalent function has been achieved heretofore by the provision of a special command or instruction, commonly called an Extract command, by which an operand can be modified in the computer to clear all but selected digits in the operand word. This necessitates special programming to execute a series of commands in which only a portion of the operands are to be used. Not only is the programming made more involved, but the operating time is increased because of the additional fetch and execute times required for each Extract operation.

The present invention permits the programmer to incorporate field selection as part of certain commands where he desires to use less than complete words. The format of the commands includes two digits which uniquely specify the desired field within the complete word of the operand. A third digit may be used to specify whether a field selection is to be made or the entire word is to be used. Thus field selection may be made part of any command.

In brief, the invention is directed to a digital computer which includes a register for storing a command word in electrically coded form and a register for storing an operand word in electrically coded form. Two digits in the command word uniquely determine the location and length of the field to be selected in the operand word, i.e., the selected digits in the word which are in the field and, consequently, also the digits of the word which are out of the selected field. Means is provided for sensing the two digits as stored in the command register and indicating, in response thereto, the time intervals during which the digits in the selected field are transferred out of the operand storing means by clock pulses generated in the computer. According to the command word, the indicated in-the-field digits are then manipulated by the computer in any desired manner.

For a more complete understanding of the invention, reference should be had to the accompanying drawings, wherein.

Figure 1:
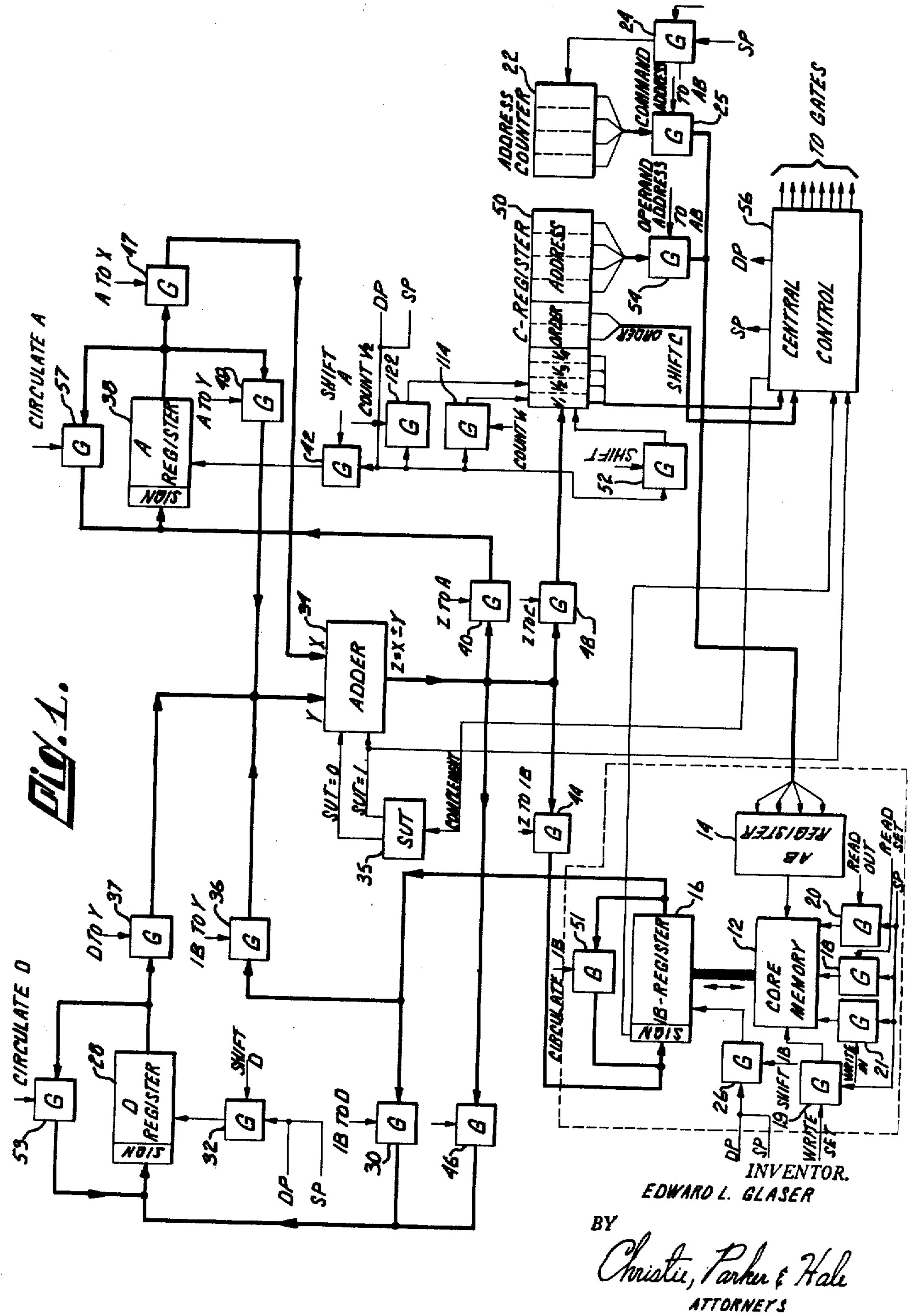
FIG. 1 is a block diagram showing the basic units of a computer employing the present invention, the heavy lines indicating the flow of information and the light lines indicating the control circuits.

Referring to FIG. 1 there is shown by way of example a block diagram of the basic units of a digital computer of the serial type to which the present invention is applied While information can be coded in any desired form in the registers of the computer, it is assumed that information is represented in binary-coded decimal form, i.e., decimal digits are represented by four binary bits preferably according to a 1, 2, 4, 8 code. This is a conventional code and requires four flip-flops to store four bits representing one decimal digit. The four flip-flops which store one digit are referred to as a decade.

Further, in the computer of FIG. 1 it is assumed that all information is stored in the form of words, the standard word length being ten digits plus a sign digit. The digits comprising words are generally circulated serially, i.e., a digit at a time, in the computer of FIG. 1 by transferring simultaneously in parallel the four bits representing a digit from one decade to another.

Words circulated in the computer are generally of two designated types, namely, operands and commands. The command words have designated digits which represent the order to be executed, such as the order to execute an add cycle, a multiply cycle, or the like. The other designated digits in the command word represent the address of operands stored in the memory portion of the computer, each command containing the address of the operand to be used in executing the particular command.

With these general principles of operation in mind, reference may be had to the details of FIG. 1 in which the numeral 10 indicates generally the memory portion of the computer in which commands and operands are stored. The memory 10 is preferably of a random access magnetic core type such as described in detail in the book "Digital Computer Components and Circuits" by R. K. Richards, D. Van Nostrand & Co., 1957, Chapter 8. The computer memory includes a core memory circuit 12 which comprises a coincidence core matrix circuit and suitable driver and sensing circuits. Associated with the core memory circuit 12 is an address buffer (AB) register 14 and an information buffer (IB) register 16. The AB-register 14 includes four decades, for example, for storing the digits designating an address location in memory, the levels in the flip-flops of the AB-register 14 being used by the core memory circuit 12 to read in or read out a word from the designated location in the core memory.

The IB-register 16 includes eleven decades for temporarily storing one complete word. Information bits can be transferred in parallel from the flip-flops of the eleven decades to a designated memory location or out of a designated memory location in the core memory circuit 12. A pulse applied through a gate 18 may be used to set the core memory circuit 12 to read out information in a designated address location to the IB-register 16. Actual transfer is effected by a pulse passed by a second gate 20 whereby transfer to the IB-register can be synchronized to take place at a particular pulse time. Similar gates 19 and 21 pass pulses for setting the core memory circuit 12 to write in information and for effecting the actual transfer from the IB-register into the core memory circuit.

Commands are generally fetched from the core memory 12 in a predetermined sequence. The address for fetching commands can be controlled by an address counter 22. The address counter comprises four decades, each decade acting as a decimal counter or scaler, producing an overflow or carry pulse when the decade is counted ten times. The decade storing the least significant digit is stepped by input pulses applied through a gate 24. Each of the other decades is stepped by the overflow pulses from the next lower order decade. The address counter 22 is counted up one unit at a time by an input pulse following each fetch operation of a command from the memory 10. Parallel transfer of the four digits from the address counter 22 to the AB-register 14 is effected by opening a gating circuit 25 at the appropriate time.

Once a word is read in the IB-register 16 of memory, it can be read out serially to a number of different locations in the computer. To this end the IB-register 16 is arranged as four conventional shift registers in parallel for shifting out four bits comprising one digit each time a shift pulse is applied to the register, starting with the four bits defining the least significant digit and ending with the sign digit. To shift information out, shift pulses are applied, as required, to the register through a gate 26.

One route of transfer of words from the IB-register 16 is to a D-register 28 which is substantially identical to the register 16. Transfer is controlled by a gate circuit 30 which controls the transfer of the four bits of each digit transferred. Shifting pulses are applied to the D-register 28 through a gate 32. With the gate 30 open, and shifting pulses applied through open gates 26 and 32, digits are transferred serially from the IB-register 16 into the sign decade end of the D-register 28. After eleven shifting pulses, one complete word is transferred from the register 16 to the register 28.

Words may be transferred a digit at a time from either the IB-register 16 or the D-register 28 to the Y-input of an adder circuit 34 having an X-input, a Y-input, and a Z-output, transfer being effected through gate circuits 36 and 37. The added 34 may be any type of conventional binary-coded decimal adder for producing a binary-coded decimal sum Z, together with a decimal carry, in response to two binary-coded decimal inputs X and Y. See for example the added described in the British Patent 750,475 published June 13, 1956. The adder is arranged to produce either a sum or difference ($Z=X\pm Y$), depending upon the setting of a flip-flop or a toggle 35, designated SUT.

The output at Z of the added 34 generally is gated to an accumulator register 38 designated the A-register, the transfer being controlled by a gate 40. The A-register is the same as the IB and D-registers described above. Shifting pulses are applied to the A-register 38 through a gate 42 to shift digits serially through the A-register. The output of the A-reigster may be coupled to the X-input of the adder 34 by a gate 47 or to the Y-input of the adder by a gate 49.

The Z-output from the adder 34 may also be gated to the input of the IB-register 16 by means of a gate 44, or to the input of the D-register 28 through a gate 46 if desired for a particular operation. The Z-output from the adder 34 may also be gated, by means of a gate 48, to the input of a command register 50, designated the C-register similar to the A-register 38. Shifting pulses are applied to the C-register 50 through a gate 52. The IB, D, and A-registers are provided with gated circulation paths. The output of each register is coupled back to the input through a gate, such as indicated at 51, 53, and 57 respectively.

As pointed out heretofore, certain of the digits in the command word constitute and address for the operand in memory. These digits are sensed in the first four decades on the righthand end of the C-register 50, and are transferred in parallel to the AB-register 14 by means of a gating circuit 54.

In operation, the computer fetches one command at a time from memory, according to the condition of the address counter 22, the command being transferred into the C-register 50. Once the command is in the C-register 50, it is used to control the subsequent execute operation of the computer according to the order stored in the next two decades of the C-register 50 following the address decades.

The fetch operation involves an operational routine as does the execution of each of the commands. The particular sequence of steps or sub-operations which the computer goes through during a given command or during a fetch operation is uniquely determined by a central control unit 56. The central control unit senses the condition of the two decades in the C-register 50 in which the order digits are stored. It also contains a number of logic toggles, such as an Execute toggle that is set according to whether a fetch operation or an execute operation is to be performed. In response to the information fed into it, the central control circuit 56 sets the many gates in the computer by which the flow of information between the various registers and the adder is effected.

Figure 2:
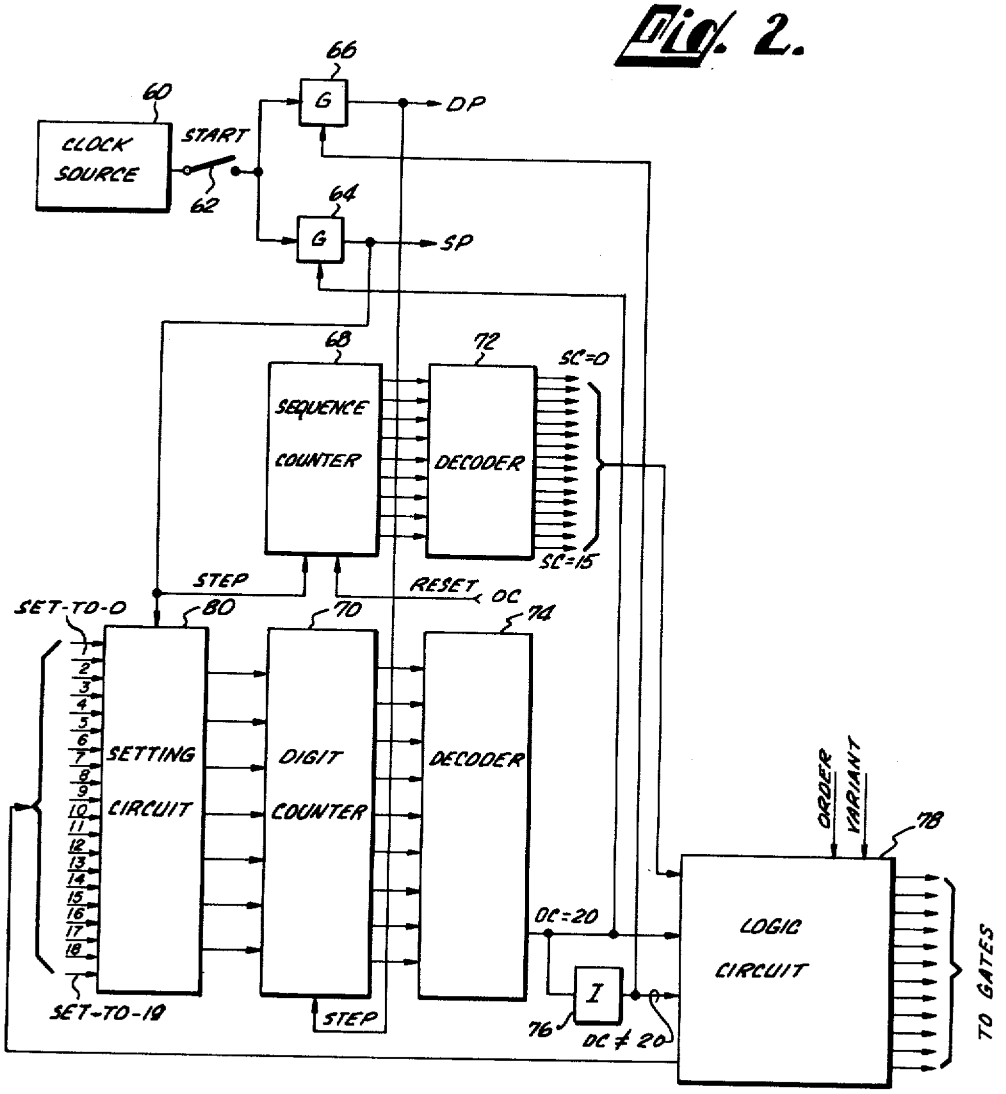
FIG. 2 is a more detailed block diagram of the central control for the computer shown in FIG. 1.

The central control circuit 56, as shown in block form in FIG. 2, includes a clock source 60 with which all operations of the computer are synchronized. Two types of pulses are derived from the clock source 60 when a starting switch 62 is closed, namely, sequence pulses, designated SP, and digit pulses, designated DP. The two types of pulses are derived by means of gates 64 and 66 respectively.

The central control circuit 56 includes two different counters, a sequence counter 68 and a digit counter 70. The sequence counter 68 may be a conventional straight binary counter having, for example, four flip-flop stages for providing sixteen different binary count conditions. A decoder circuit 72 senses the condition of each of the flip-flops in the counter 68 and raises to a high potential level one of sixteen separate output lines according to the count condition of the sequence counter 68. The decoder 72 may be a conventional diode matrix circuit for converting from binary to decimal form. See for example, the above-mentioned book by R. K. Richards, pages 56–60. The sixteen output lines are designated $SC=0$, $SC=1$, etc.

The sequence counter 68 is reset to zero at the start of each operation of the computer, such as at the start of a fetch operation or the execution of a command, by an OC pulse generated at the completion of the previous operation. The sequence counter is counted by SP's derived from the clock source 60 through the gate 64.

The digit counter 70 is also a binary counter similar to the counter 68. The digits counter 70 preferably includes five flip-flop stages, enabling it to count to as high as 32. However, it has been found that a count of 20 is adequate for most operations, although this figure is given by way of example only. The digit counter 70 is stepped or counted up by means of DP's derived from the clock source 60 through the gate 66. As in the case of the sequence counter 68, a decoder circuit 74 senses the condition of the flip-flop stages in the digit counter 70. However, the decoder 74 need have only one output line which is raised to a high potential level whenever the digit counter 70 is in the count 20 condition designated $DC=20$. The $DC=20$ output of the decoder is applied to the gate 64 so that the gate 64 is biased open to pass pulses from the clock source 60 to the sequence counter 68 only when the digit counter 70 is in the count 20 condition. The gate 66 is connected to the output of the decoder 74 through an inverter circuit 76 whereby the gate 66 is biased open whenever the digit counter is in a count condition other than 20, designated $DC=20$. In other words, SP's are generated whenever the digit counter is equal to 20, and DP's are generated whenever the digit counter is not equal to 20.

The output lines of the decoders 72 and 74 are applied to a logic circuit 78. The logic circuit 78 also senses the digits stored in the order portion of the command register 50, the digits in the sign positions of the IB-register 16 and the A-register 38 as well as the state of SUT flip-flop 35 associated with adder 34 and the presence of a decimal carry from the adder 34. The logic circuit senses the stepping of the sequence counter 68, and in response to the order being executed as set by the digits in the order portion of the C-register 50, may set the digit counter 70 to any value other than 20 at any step of the sequence counter. This of course interrupts the action of the sequence counter until the digit counter is counted back to 20 by DP's. Setting of the digit counter is accomplished through a setting circuit 80, which may be a diode matrix circuit for converting from decimal notation to binary notation. The decimal input includes twenty input lines, designated set-to-0, . . . set-to-19. The setting circuit 80 also includes gates on each of the lines to the digit counter 70 by means of which each of the flip-flops in the digit counter 70 may be set to correspond to any decimal digit less than 20 in response to an SP applied to the setting circuit 80 and a high voltage level applied to a corresponding one of the setting inputs. Thus by proper design of the logic circuit 78, any number of DP's can be generated between pairs of SP's for controlling computer operations.

In addition to controlling the sequence of SP's and DP's for each command, the logic circuit controls all the gates in the computer to control the transfer of information among the several registers and the adder. The logic circuit 78, in response to the stepping of the sequence counter 68, provides a series of different gating patterns in carrying out a given command, the patterns for each count condition of the sequence counter 68 being different for each command. At any given setting of the sequence counter 68, the sequence counter of course may be interrupted and a predetermined number of DP's generated for shifting the registers to shift information in the computer.

From the description thus far, it will be apparent that by suitable design of the logic circuit 78, the computer can be made to carry out a sequence of sub-operations for each command. In copending application Serial No. 788,823 filed January 26, 1959, now Patent No. 3,001,708, and assigned to the same assignee as the present invention, the design of the logic circuit for carrying out the fetch operation by which commands are transferred from memory into the command register and the logic circuit for carrying out an addition is described.

The concept of field selection, to which the present invention is directed, can be incorporated in a number of different commands by suitable design of the logic circuit 78. It is not believed necessary to the teaching of the present invention to describe the logic circuit for more than one command employing field selection to show the manner in which the logic circuit 78 can be made to effect field selection.

Consider first the design of the logic circuit for the Store command in which a word in the accumulator or A-register 38 is transferred to a specified address location in the core memory 12 for storage in memory. According to the command format used in the computer as described, the first four digits of the command word starting from the right identify the address location in memory associated with that command. The next two digits going from right to left identify the order to be executed. The next four digits are referred to as variant digits and may be used for modifying the command operation in specified instances, such as effecting field selection according to the present invention. The four decades in the command register 50 which store the variant digits are designated, from left to right, $V_1$, $V_2$, $V_3$, and $V_4$.

In most commands in which it is used, the field selection is made optional. This is determined by the digit of the command stored in the $V_3$ decade of the command register 50. If the digit stored in the $V_3$ decade is even, this is interpreted to mean that the entire 11-digit operand word specified by the command address is to be operated on by the computer. If the $V_3$ decade contains an odd digit, this is interpreted to mean that field selection of a group of ten digits or less from the entire word is to be made. In the latter case, the digits in the variant decades $V_1$ and $V_2$ are used to establish the start of the field and the length of the field.

Under field selection of digits in a word, the term "in the field" refers to the group of digits selected by the varient digits in the decades $V_1$ and $V_2$. The term "out of the field" refers to all other digits in the word, which digits may be either to the right or to the left of the field digits or both.

For convenience, the digit storing positions in a given register are identified as follows:

The first decade to the left is referred to as the sign decade and it stores the sign digit of the word. The remaining decades of each register and the corresponding digits of the stored word are numbered 1 through 10 going from left to right. If the first digit at the right-hand end of the field is to be the digit in the 8 position of the word, for example, the digit 8 will be stored in the variant decade $V_1$. If the first digit in the field is to be the digit in the 10 position, a zero will be stored in the variant decade $V_1$ of the command register, a zero being interpreted as a 10 in this case. Similarly, if the field is to consist of five digits, a 5 will be stored in the variant decade $V_2$ of the command register 50, and if it is to consist of ten digits, a zero will be stored in the variant decade $V_2$ of the command register 50, again a zero being interpreted as a 10 in this case.

Figure 3:
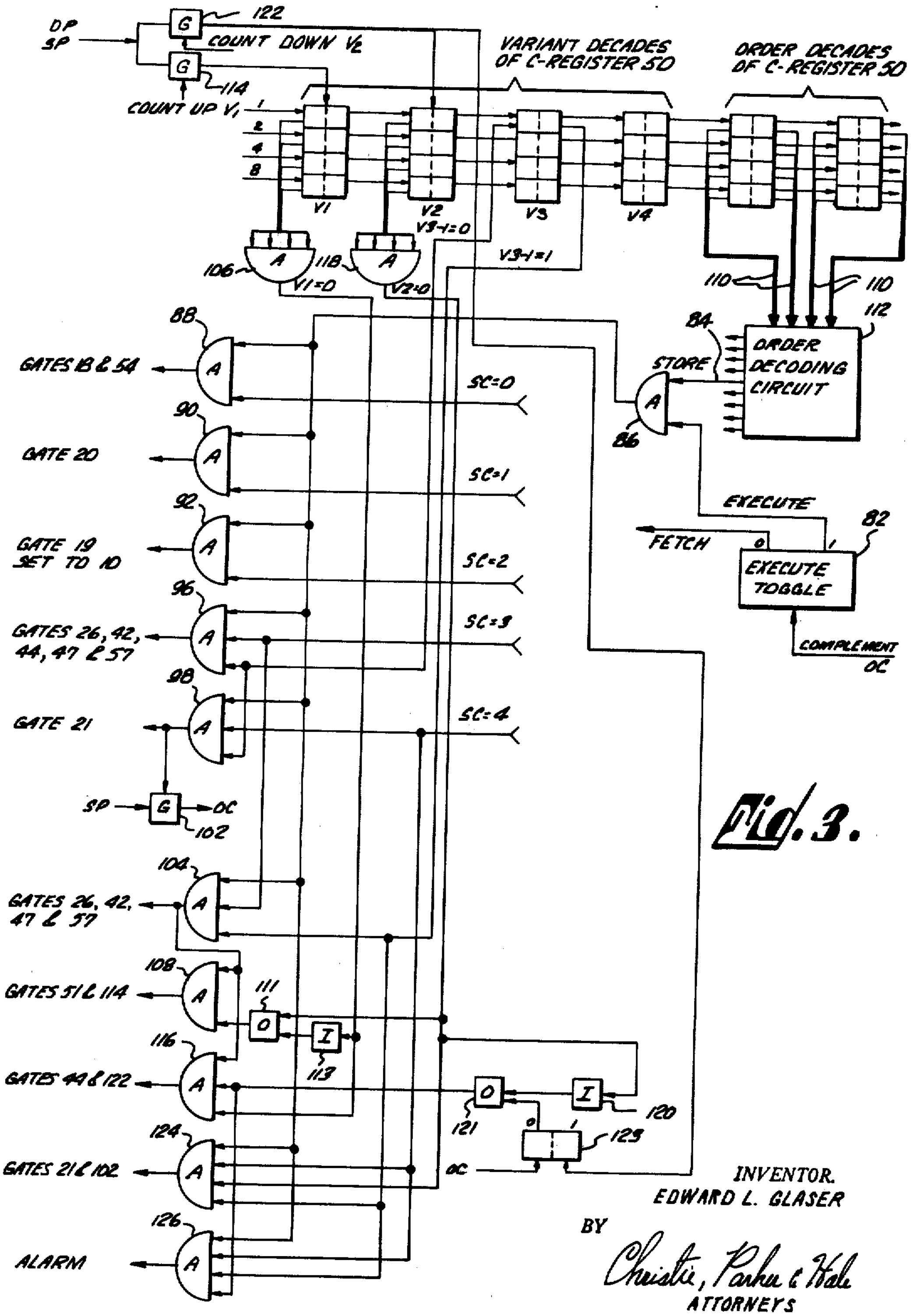
FIG. 3 is a logic diagram of a gating circuit required to execute a Store operation with field selection.

Referring now to FIG. 3 in detail, which shows the logic circuit 78 for executing the Store command together with the appropriate decades of the C-register 50, the numeral 82 refers to an Execute toggle or flip-flop which is complemented at the end of each operation by an operation-complete pulse OC. Under normal operation the computer alternately performs a fetch operation, in which a command is fetched from memory to the command register 50, and an execute operation in which the command stored in the C-register is executed. Such operation is described in more detail in the above-identified copending application. Assuming for the moment that the fetch operation has been completed and a Store command has been transferred to the C-register 50, the Execute toggle 82 will have been complemented to the stable state calling for execution of the command.

The order digits in the C-register 50 are sensed by an order decoding circuit 112 which is a conventional binary-to-decimal converter by means of which the binary coded digits in the two order decades are sensed and caused to energize to a high potential level one of one hundred corresponding output lines. With the order in the command register calling for a Store operation, an output line 84 corresponding to the Store command is raised to a high level. A logical *and* circuit 86 senses when the Store command is called for by the order decoding circuit 112 and the Execute operation is called for by the Execute toggle 82.

The first operation that the logic circuit 78 must perform in executing the Store command is to transfer the operand in the designated address location of the core memory 12 into the IB-register 16. To this end a logical *and* circuit 88 senses the output of the *and* circuit 86 and also the $SC=0$ line from the decoder 72. Thus in the initial condition of the sequence counter 68, the output of the logical *and* circuit 88 is raised to a high level during execution of the Store command. This is used to bias open the gate 54 whereby the address digits in the C-register 50 are transferred by the next SP to the AB-register 14 of the memory circuit 10. At the same time, the gate 18 is biased open so that the same SP sets the core memory circuit 12 to the readout condition. The same SP also advances the sequence counter to the next count condition.

With the sequence counter in the next count condition, the $SC=1$ line is raised to a high level. This is sensed by a logical *and* circuit 90 together with the output from the *and* circuit 86. The logical *and* circuit 90 biases open the gate 20 whereby the next SP causes the selected operand to be shifted in parallel to all the decades of the IB-register 16. The same SP steps the sequence counter so that the $SC=2$ line from the decoder 72 is raised to a high level. This is sensed together with the output of the logical *and* circuit 86 by a logical *and* circuit 92. The output of the logical *and* circuit 92 is applied to the gate 19 in the memory circuit 10, and also is applied to the set-to-10 input line of the setting circuit 80. As a result the next SP is passed by the gate 19 to set the core memory 12 for a write-in operation and applied to the setting circuit 80 for setting the digit counter 70 to the $DC=10$ count condition. The SP also steps the sequence counter 68 to the $SC=3$ count condition. The SP also steps the sequence counter 68 to the $SC=3$ count condition.

With the digit counter 70 in the count 10 condition, there are generated ten DP's followed by the next SP, making a group of eleven pulses. These eleven pulses are used to transfer the word in the A-register 38 to the IB-register 16, from which the word is transferred in parallel to the core memory 12. To this end, the $SC=3$ line from the decoder 72 is applied to a logical *and* circuit 96 together with the output from the logical *and* circuit 86. The logical *and* circuit 96 is also connected to the flip-flop in the $V_3$ decade of the C-register 59 storing the lowest order bit for determining if the digit stored in the $V_3$ decade is odd or even. If the digit is even, indicating that no field selection is to be made for the command stored in the C-register, a line $V_3-1=0$ from the lowest order flip-flop is at a high level, which level is applied to the logical *and* circuit 96. Thus the output of the logical *and* circuit 96 is at a high level only when field selection is not required in the Store command operation.

The logical *and* circuit 96, when the above conditions are true, biases open the gate 42 for applying shifting pulses to the A-register 38. It also biases open the gate 47 for passing the digits shifted out of the A-register 38 to the X-input of the adder 34. It also opens the gate 57 to permit recirculation of the word stored in the A-register 38. Also the gate 26 is opened to apply shifting pulses to the IB-register 16 and the gate 44 is open to permit information from the Z-output of the adder 34 to pass to the input of the IB-register 16. The ten DP's plus the following SP shift the registers 38 and 16 eleven times, whereby the eleven digits from the A-register 38 are transferred into the IB-register 16 through the adder 34. The adder 34 has no storage and introduces a time delay which is less than the clock pulse time interval. Thus the same pulse that shifts the information out of the A-register 38 may be used to shift the IB-register 16 one place so that the digit can be stored in the sign position of the IB-register 16. The eleventh pulse, which is an SP, shifts the sequence counter to the $SC=4$ condition.

A logical *and* circuit 98 senses when the sequence counter is in the $SC=4$ condition as well as sensing the output of the logical *and* circuit 86 and the condition of the $V_3-1=0$ line from the variant decade $V_3$. If all conditions are true, the output of the logical *and* circuit 98 biases open a gate 21 in the memory circuit 10, the gate 21 passing the next SP to the core memory 12 for writing into the core memory in parallel the digits stored in the IB-register 16. The output of the logical *and* circuit 98 also biases open a gate 102 for passing the next SP, which pulse acts as an operation-complete pulse OC that is used among other operations in the computer to reset the Execute toggle 82 to initiate the next command fetch operation and to reset the sequence counter 70 to zero. As shown in the drawings, an OC pulse is applied to the complementary input to the toggle 82 and to the reset input of the counter 68.

If the variant digit in the decade $V_3$ is odd, indicating that field selection is to take place with the start of the field represented by the digit in the decade $V_1$ and the length of the field represented by the digit in the decade $V_2$, a slightly different logic sequence takes place. The operation is the same for the $SC=0$, 1, and 2 conditions as described above. However, when the sequence counter reaches the $SC=3$ condition, if the variant decade $V_3$ has an odd digit stored in it, the output of the logical *and* circuit 96 is not raised to a high level. However, a logical *and* circuit 104 responsive to the $SC=3$ line from the decoder 72 and to the output of the logical *and* circuit 86, senses the condition of the $V_3-1=1$ line from the variant decade $V_3$. The output of the logical *and* circuit 104 biases open the gates 26, 42, 47, and 57. In this manner the shifting pulses are applied to the IB-register 16 and the A-register 38. Also, the A-register 38 is permitted to recirculate by the opening of the gate 57 and information is shifted to the adder 34 through the gate 47. As long as the digits shifted out of the A-register are out of the field, it is desired that the gate 44 remain closed so that no information can be shifted out of the adder into the input of the IB-register 16. At the same time, it is desirable that gate 51 remain open so that the IB-register 16 can recirculate.

To sense whether the digits being shifted out of the A-register 38 are in the field or out of the field, a logical *and* circuit 106 is connected to each of the flip-flops in the variant decade $V_1$. The flip-flops of the decade $V_1$ each apply a high level voltage to the *and* circuit 106 when a zero is stored in the decade. Thus the output of the logical *and* circuit 106 is at a high level when the flip-flops in the variant decade $V_1$ are in the zero condition. An *and* circuit 108 is connected to the output of the logical *and* circuit 104 and also is connected to the output of the logical *and* circuit 106 through a logical *or* circuit 111 and an inverter 113. If the variant decade $V_1$ is not equal to zero, the output of the *and* circuit 106 is at a low level which is changed to a high level by the inverter 113, this high level being applied through the logical *or* circuit 111 to the logical *and* circuit 108. Thus if the digit stored in the $V_1$ decade is other than zero, indicating that the first digit in the field is other than the digit in the ten position of the word, the outputs from the *and* circuits 104 and 108 are both in a high level condition. The logical *and* circuit 108 biases open the gate 51, causing the IB-register 16 to recirculate in response to the first DP generated by the setting of the digit counter to 10 at $SC=2$ time.

The output of the logical *and* circuit 108 is also applied to a gate 114, which, when open, passes SP's and DP's from the clock source. The four flip-flops of the variant decade $V_1$ are arranged to operate as a decimal counter in response to applied counting pulses. It is well known that if four complementing flip-flops are connected in a simple chain circuit, the circuit can be caused to count up or count down, in response to pulses applied to one flip-flop, to any predetermined count condition within the maximum count possible in the counter. See for example the book "Digital Computer Components and Circuits" by R. K. Richards, D. Van Nostrand Co., 1957, page 399. Thus the four flip-flops comprising the decade $V_1$ are caused to count up from zero to nine and then return to zero, in response to input pulses passed by the gate 114. In this way if the start of the field is any digit other than the digit in the 10 position, the counter formed by the decade $V_1$ is caused to count up through nine and back to zero. In this manner the logical *and* circuit 108 remains open for the number of DP's required to advance the $V_1$ decade counter up through nine and back to zero. For example, if the first digit in the field is to be the digit in the 7 position of the word, a seven is stored in the variant decade $V_1$ as part of the command. Three pulses are required to advance the counter through nine and back to zero. Thus the gate 114 for advancing the decade counter $V_1$ remains open to pass the first three DP's.

After the required number of DP's are passed by the gate 114 to advance the decade $V_1$ counter back to zero, the output level of the logical *and* circuit 108 drops. This may require any number of DP's from zero to nine in number. The gates 51 and 114 are thereby closed, stopping further counting of the decade counter and stopping the recirculating of the IB-register 16.

At the same time the gate 44 is opened so that the first digit in the start of the field can be passed to the input of the IB-register 16 by the next DP. The gate 44 is controlled by a logical *and* circuit 116 connected to the output of the logical *and* circuit 104. The logical *and* circuit 116 is also connected to the output of the logical *and* circuit 106 so that it senses when the decade counter $V_1$ is counted to the zero. The logical *and* circuit 116 is also coupled to the output of a logical *and* circuit 118 through an inverter 120 and a logical *or* circuit 121. The logical *and* circuit 118 senses the condition of the flip-flops in the variant decade $V_2$ and provides a high level output when the decade $V_2$ is zero. The output of the inverter 120 is at a high level whenever the decade $V_2$ stores a digit other than zero, indicating that the length of the field is some number other than zero.

The variant decade $V_2$ is also arranged as a decimal counter the same as the variant decade $V_1$. However, the decade counter $V_2$ is arranged to count down in response to pulses rather than count up. The count down pulses are applied through a gate 122 which is biased open by the output of the logical *and* circuit 116.

As mentioned above, the number indicative of the number of digits in the field is stored in the variant decade $V_2$. Therefore if a 3, for example, is stored in the variant decade $V_2$, three pulses are required to count the decade down to zero. When the decade $V_2$ is counted down to zero, the gate 122 is closed by the logical *and* circuit 116. However, the three pulses which count down the counter $V_2$ also permit three digits, corresponding to the length of the field, to be transferred through the open gate 44 from the output of the adder 34 to the input of the IB-register 16.

As mentioned above, a zero digit in the variant decade $V_2$ position of the command word is interpreted as a ten, i.e., that the field is to be ten digits in length. However, an initial zero in the variant decade $V_2$ would prevent the logical *and* circuit 116 from going high. In order that an initial zero can be interpreted as a field length of ten digits, a logic flip-flop 123 is provided that is initially set by an OC pulse to its zero state. This condition is sensed by the logical *and* circuit 116 through the logical *or* circuit 121. Even if the output of inverter 120 is low because the variant decade $V_2$ is zero, the flip-flop 123 provides a high level to the logical *and* circuit 116. The first pulse passed by the gate 122 steps the variant decade $V_2$ to the 9 count condition and also actuates the flip-flop 123. After the tenth pulse passed by the gate 122, the decade $V_2$ is back to zero, and because the flip-flop 123 has been changed, the output of the logical *or* circuit goes low. This results in closing of the gates 44 and 122 to prevent transfer of digits that are out of the field.

When the decade $V_2$ is counted down to zero, the output of the logical *and* circuit 118 goes high by sensing a high level derived from each of the flip-flops of the decade $V_2$. This is applied through the logical *or* circuit 111 to the logical *and* circuit 108. This again causes the recirculating gate 51 associated with the IB-register 16 to open, causing recirculation of the remaining digits in the IB-register 16 of the word originally stored therein from the core memory 12. While the gate 114 is also opened again, further stepping of the decade counter $V_1$ is of no effect since the decade counter $V_2$ is zero and the flip-flop 123 has not been reset. Therefore no in the field condition can again pertain until an OC is produced.

It will be appreciated from the above description that field selection results in selected digits in the field being transferred from the A-register 38 to the IB-register 16. All other digits in the word stored in the IB-register 16 remain the same by virtue of the recirculation of digits outside the field. The first digit in the field to be transferred from the A-register to the IB-register is determined by the digit stored in the variant decade $V_1$ and the number of digits transferred in the field from the A-register 38 to the IB-register 16 is determined by the digit stored in the variant decade $V_2$.

After ten DP's, the subsequent SP sets the sequence counter to the SC=4 condition. This is sensed by a logical *and* circuit 124 which is also connected to the $V_3-1=1$ line for sensing that the field selection is taking place. It also is coupled to the output of the logical *and* circuit 118 to determine that the variant decade $V_2$ has been counted down to zero, indicating that the entire field called for has been stored in the IB-register 16. If all these conditions are true, the output of the logical *and* circuit 124 biases open the gates 21 and 102, causing the next SP to write the word stored in the IB-register 16 in the designated memory location of the core memory 12 and to generate an OC.

A logical *and* circuit 126 senses the same conditions as the logical *and* circuit 124 except that it is connected to the logical *and* circuit 118 through the inverter 120. Thus the logical *and* circuit 126 provides a high level output when the varient decade $V_2$ has not been counted down to zero. This is used to actuate an alarm, indicating that through some error, the specified field extends beyond the sign of the word.

From the above description it will be readily apparent that the variant decades, operating as counters, provide a convenient means for indicating when digits of a word, being shifted at any given time, are in the field or out of the field. If both decades are not equal to zero, or both decades are equal to zero, and the logic flip-flop 123 is set, operation is out of the selected field. When the variant decade $V_1$ is equal to zero and the variant decade $V_2$ is not equal to zero, operation is in the field. By using the variant decades $V_1$ and $V_2$ with any command in which field selection is desired, the logic circuit for that command can be designed to sense the possible conditions of the decade counters $V_1$ and $V_2$ and control the operation of the computer accordingly.

What is claimed is:

1. In an internally programmed computer in which digits are transferred serially in binary-coded decimal form, the four binary bits of each decimal digit being transferred in parallel, the combination comprising shift register means for storing and serially shifting a group of digits constituting a command, the shift register means including four flip-flops for each digit stored, means for coupling the four flip-flops storing a first one of the digits in the register means as a first decimal counter, means for coupling the four flip-flops storing a second one of the digits in the register means as a second decimal counter, means for counting up the first decimal counter in response to applied counting pulses, means for counting down the second counter in response to applied counting pulses, a clock pulse source, first gating means for gating pulses from said source to the means for counting up the first decimal counter, second gating means for gating pulses from said source to the means for counting down the second decimal counter, the first gating means being initially open at the start of an execute operation by the computer, means responsive to the count condition of the first decimal counter for closing the first gating means when the first decimal counter is counted up through nine and returned to zero, means responsive to the closing of the first gating means for opening the second gating means, whereby the second counter is caused to count following the counting of the first counter, means responsive to the count condition of the second counter for closing the second gating means when the second counter is counted down to zero, and means for transferring the digits of an operand word digit by digit in synchronism with the counting of the decimal counters by the counting pulse, the transferring means including gating means controlled by the counters for selectively passing the digits of the operand word to one output only during the counting of the second counter.

2. In an internally programmed computer in which digits are transferred serially in binary-coded decimal form, the four binary bits of each decimal digit being transferred in parallel, the combination comprising shift register means for storing and serially shifting a group of digits constituting a command, the shift register means including four flip-flops for each digit stored, means for coupling the four flip-flops storing a first one of the digits in the register means as a first decimal counter, means for coupling the four flip-flops storing a second one of the digits in the register means as a second decimal counter, means for counting up the first decimal counter in response to applied counting pulses, means for counting down the second counter in response to applied counting pulses, a clock pulse source, first gating means for gating pulses from said source to the means for counting up the first decimal counter, second gating means for gating pulses from said source to the means for counting down the second decimal counter, the first gating means being initially open at the start of an execute operation by the computer, means responsive to the count condition of the first decimal counter for closing the first gating means when the first decimal counter is counted up through nine and returned to zero, means responsive to the closing of the first gating means for opening the second gating means, whereby the second counter is caused to count following the counting of the first counter, means responsive to the count condition of the second counter for closing the second gating means when the second counter is counted down to zero, means responsive to the count condition of the first and second counters for modifying the operation of the computer according to the stored command during the interval after the first counter stops counting and the second counter is still being counted.

3. In an internally programmed computer in which digits are transferred serially in binary-coded decimal form, the four binary bits of each decimal digit being transferred in parallel, the combination comprising means for storing and serially shifting a group of digits constituting a command, said means including four flip-flops for each digit stored, means for coupling the four flip-flops storing a first one of the digits in said storing means as a first decimal counter, means for coupling the four flip-flops storing a second one of the digits in said storing means as a second decimal counter, means for counting up the first decimal counter in response to applied counting pulses, means for counting down the second counter in response to applied counting pulses, a clock pulse source, first gating means for gating pulses from said source to the means for counting up the first decimal counter, second gating means for gating pulses from said source to the means for counting down the second decimal counter, the first gating means being initially open at the start of an execute operation by the computer, means responsive to the count condition of the first decimal counter for closing the first gating means when the first decimal counter is counted up through nine and returned to zero, means responsive to the closing of the first gating means for opening the second gating means, whereby the second counter is caused to count following the counting of the first counter, means responsive to the count condition of the second counter for closing the second gating means when the second counter is counted down to zero, means responsive to the count condition of the first and second counters for modifying the operation of the computer according to the stored command during the interval after the first counter stops counting and the second counter is still being counted.

4. In an internally programmed computer in which digits are transferred serially in binary-coded decimal form, the four binary bits of each decimal digit being transferred in parallel, the combination comprising means for storing and serially shifting a group of digits constituting a command including a first decimal counter for storing a first one of the digits of the command and a second decimal counter for storing a second one of the digits of the command, means for counting up the first decimal counter in response to applied counting pulses, means for counting down the second counter in response to applied counting pulses, a clock pulse source, first gating means for gating pulses from said source to the means for counting up the first decimal counter, second gating means for gating pulses from said source to the means for counting down the second decimal counter, the first gating means being initially open at the start of an execute operation by the computer, means responsive to the count condition of the first decimal counter for closing the first gating means when the first decimal counter is counted up through nine and returned to zero, means responsive to the closing of the first gating means for opening the second gating means, whereby the second counter is caused to count following the counting of the first counter, means responsive to the count condition of the second counter for closing the second gating means when the second counter is counted down to zero, means responsive to the count condition of the first and second counters for modifying the operation of the computer according to the stored command during the interval after the first counter stops counting and the second counter is still being counted.

5. In an internally programmed computer in which digits are transferred serially in binary-coded decimal form, the four binary bits of each decimal digit being transferred in parallel, the combination comprising means for storing and serially shifting a group of digits constituting a command including a first counter for storing a first one of the digits of the command and a second counter for storing a second one of the digits of the command, means for stepping the first counter in response to applied pulses, means for stepping the second counter in response to applied pulses, a clock pulse source, first gating means for gating pulses from said source to the means for stepping the first counter, second gating means for gating pulses from said source to the means for stepping the second counter, the first gating means being initially open at the start of an execute operation by the computer, means responsive to the count condition of the first counter for closing the first gating means and opening the second gating means when the first counter is stepped to a predetermined count condition, means responsive to the count condition of the second counter for closing the second gating means when the second counter is stepped to a predetermined count condition, means for storing an operand word, means for shifting out one digit of the operand word in synchronism with each stepping of the first and second counters by said pulses, and gating means controlled by the second counter for passing only the digits shifted in synchronism with the stepping of the second counter.

6. In an electronic digital computer which normally manipulates operands of fixed word length in serial fashion, apparatus for selecting portions of the operands for manipulation in a particular command comprising means for storing a command word, first and second counters, means for setting the counters in response to predetermined digits in the stored command word, means including a source of synchronizing pulses for transferring an operand word in the computer digit by digit with each one of a succession of synchronizing pulses, means for stepping the first counter in response to said pulses to a predetermined count condition, the number of pulses required being determined by the setting of the first counter, means responsive to the first counter when stepped to said predetermined count condition for initiating stepping of the second counter, means responsive to said initiating means for stepping the second counter in response to said pulses to a predetermined count condition, the number of pulses required being determined by the setting of the second counter, means responsive to the counters for sensing the time interval between the time the first counter reaches its predetermined count condition and the time the second counter reaches its predetermined count condition, and means controlled by the sensing means for modifying the manipulation of the operand word digits during said time interval.

7. In an internally programmed computer in which digits are transferred serially, the combination comprising means for storing and serially shifting a group of digits constituting a command including a first counter for storing a first one of the digits of the command and a second counter for storing a second one of the digits of the command, means for counting up the first counter in response to applied counting pulses, means for counting down the second counter in response to applied counting pulses, a clock pulse source, first gating means for gating pulses from said source to the means for counting up the first counter, second gating means for gating pulses from said source to the means for counting down the second counter, the first gating means being initially open at the start of an execute operation by the computer, means responsive to the count condition of the first counter for closing the first gating means when the first counter is counted up through maximum count and returned to zero, means responsive to the closing of the first gating means for opening the second gating means, whereby the second counter is caused to count following the counting of the first counter, means responsive to the count condition of the second counter for closing the second gating means when the second counter is counted down to zero, and means responsive to the count condition of the first and second counters for modifying the operation of the computer according to the stored command during the interval after the first counter stops counting and the second counter is still being counted.

References Cited in the file of this patent

UNITED STATES PATENTS

| | | |
|---|---|---|
| 2,799,449 | Turing et al. | July 16, 1957 |
| 2,891,723 | Newman et al. | June 23, 1959 |
| 2,895,671 | St. Johnston | July 21, 1959 |
| 3,012,725 | Williams | Dec. 12, 1961 |

FOREIGN PATENTS

| | | |
|---|---|---|
| 764,522 | Great Britain | Dec. 28, 1956 |